July 12, 1932. J. J. WALLACE 1,866,685
COTTON GIN
Filed May 6, 1931 3 Sheets-Sheet 1

Inventor
Jeffrey J. Wallace
By Mason Fenwick & Lawrence
Attorneys

July 12, 1932.  J. J. WALLACE  1,866,685

COTTON GIN

Filed May 6, 1931  3 Sheets-Sheet 2

Inventor

Jeffrey J. Wallace

By Mason Fenwick Lawrence
Attorneys

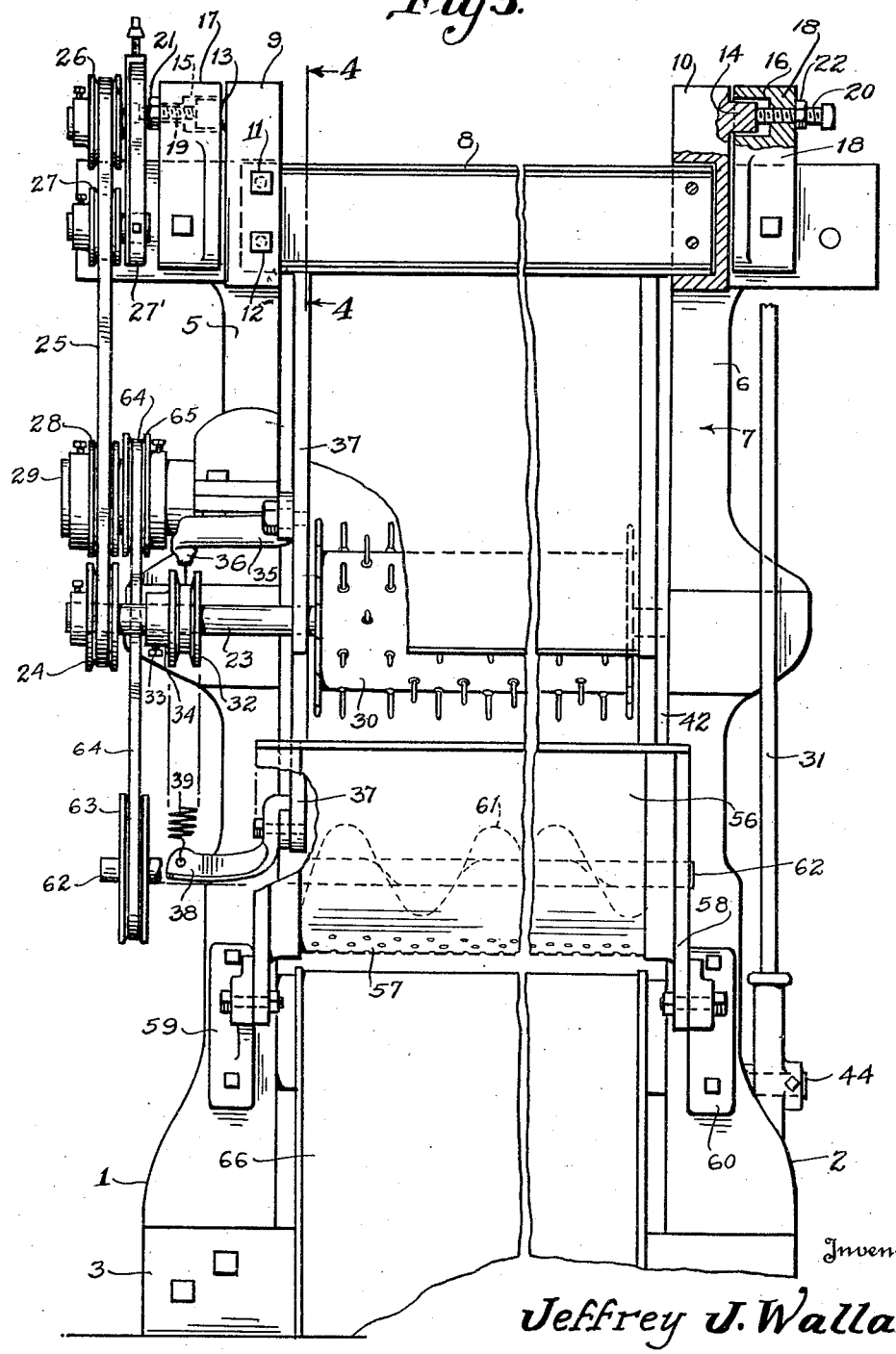

Patented July 12, 1932

1,866,685

UNITED STATES PATENT OFFICE

JEFFREY JOHN WALLACE, OF AMITE, LOUISIANA, ASSIGNOR TO GULLETT GIN COMPANY, OF AMITE, LOUISIANA

COTTON GIN

Application filed May 6, 1931. Serial No. 535,523.

This invention relates generally to improvements in cotton gins, and particularly to improvements in cotton gins of the double rib huller type.

The main object of the invention is to provide a gin of this type in which the huller roller is journaled on the cotton box frame and rises therewith when the said frame is raised from the saws. This arrangement provides a construction in which the huller roller can be automatically braked when the cotton box is raised from the saws, and without this engaging the drive belt from the roller shaft.

Another object of the invention resides in the pivotal connection between the cotton box and the gin frame, whereby the gin frame may be laterally adjusted in either direction to center the saws exactly in the spaces between the ribs carried by the cotton box.

A further object of the invention resides in the peculiar hinge connection between the cotton box and the gin frame, whereby the cotton box is always maintained in such position that the ribs are always correctly positioned relative to the saws.

Still another object of the invention resides in providing the gin frame with a conveyor hopper immediately below the huller roller, in order to convey the hulls or foreign matter which falls out of the cotton box to one end of the gin.

Another object of the invention resides in providing the aforesaid hopper with perforations of sufficient size to allow the seed that falls out with the hulls to be squeezed out and returned to the seed hopper or seed conveyor.

Other objects of the invention will become apparent as the detailed description thereof proceeds.

In the drawings:

Figure 3 is a broken front elevation of the said cotton gin, with parts omitted for clearness of disclosure.

Figure 1:
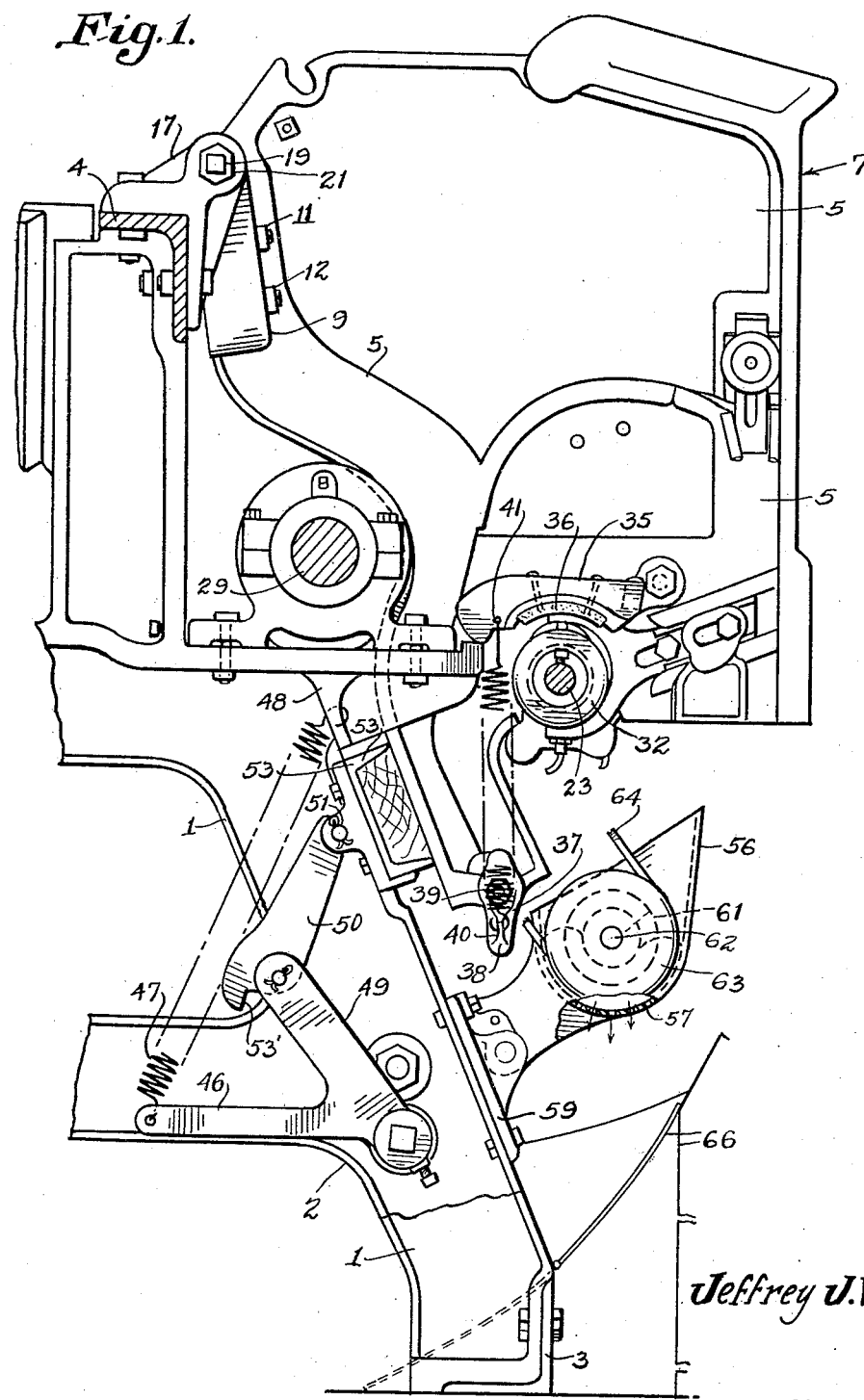
Figure 1 is an end elevation of the right hand end of a double rib huller gin, with the cotton box in ginning position.

As shown in the drawings, the cotton gin forming the present invention includes standards 1 and 2, forming the end supports for the gin mechanism. These standards are connected at the lower end in properly spaced apart positions by means of the angle iron 3; and are also connected at their upper ends by the angle iron 4 to which the cotton box is hingedly connected. Only one angle iron 3 is shown in the drawings, but it is to be understood that the other parts of the standards will be similarly secured to each other to form a rigid frame work.

Figure 4:
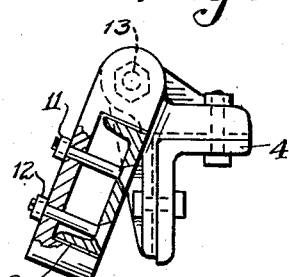
Figure 4 is a transverse vertical section taken on the line 4—4 of Figure 3.

The ends 5 and 6 of the cotton box 7 are connected by a channel bar 8 which carries the rib bar and the cotton box and castings. In order to pivot the cotton box adjustably to the frame work of the gin, the castings which form the ends 5 and 6 of the cotton box have the trunnion members 9 and 10 suitably bolted thereto. As shown in Figure 4 of the drawings, each of the trunnion members 9 and 10 is recessed to fit tightly over the channel bar 8, and is secured thereto by means of the bolts 11 and 12.

The members 9 and 10 are provided with trunnions 13 and 14 respectively. These trunnions are mounted to rotate in apertures 15 and 16, formed in bearing members 17 and 18 respectively, which are suitably bolted or otherwise secured to the angle iron 4, as shown in Figures 1 and 3 of the drawings. The apertures 15 and 16 are of greater depth than the trunnions 13 and 14, and there is a slight space between each of the members 9 and 10, and the bearing members 17 and 18. This spacing is to permit the lateral adjustment of the cotton box as a whole along the axis of the trunnions 13 and 14.

To provide for the aforesaid lateral adjustment, the apertures 15 and 16 are centrally bored and screwthreaded to receive the adjusting screws 19 and 20 which are provided with lock nuts 21 and 22 respectively. It will be obvious from Figure 3 of the drawings that the end members 5 and 6, along with the cotton box supported thereby, can be adjusted to any desired position laterally of the gin frame work, and can be locked in this adjusted position by means of the lock nuts 21 and 22. This means that the entire cotton box can be adjusted to place the saws in the center of the spaces between the ribs, and can be locked in this position.

The huller roller shaft 23 is suitably journaled in bearings formed in the end castings 5 and 6; and this shaft projects through the casting 5 and has the driving pulley 24 keyed thereon or otherwise suitably secured thereto. The pulley 24 is driven by means of a belt 25 (see Figure 2) extending over idler pulleys 26 and 27, rotatably mounted on a bracket 27' secured to the angle iron 4, and around the pulley 28 suitably secured to the saw shaft 29.

The huller roller 30 is fixed to the shaft 23, within the gin box and is raised and lowered with the gin box by means of the lever 31 and linkage mechanism to be described hereinafter. The shaft 23 is also provided with a V-grooved braking pulley 32, secured to said shaft by means of a set screw 33 passing through a hub 34 formed on the braking pulley 32.

Immediately above the braking pulley 32, a brake shoe 35 is pivoted at one end to the casting 5, and has its lower edge curved to correspond with the curvature of the braking pulley 32. A short section 36 of braking material is shaped to fit the lower edge of the brake shoe 35, and is V-shaped in cross section to fit the V-shaped groove in the braking pulley 32. Preferably, the section 36 is made of such material as will frictionally grip the V-shaped periphery of the pulley 32 and bring it quickly to a stop.

An arm 37 extends downwardly from the casting 5 and has a laterally projecting lug 38 formed thereon. A tension spring 39 has one end hooked on to an eye 40 at the end of the lug 38, and has its other end hooked through an aperture 41 formed near the free end of the brake shoe 35. It will thus be apparent that the tension spring 39 normally holds the brake shoe 35 with its friction grip lining 36 in braking contact with the V-shaped groove of the pulley 32.

The other end casting 6 is similar in shape to the casting 5 and is provided with an arm 42 similar to the arm 37. A cross bar 43 connects the arms 37 and 42 to each other, and serves as part of a means for moving the cotton box to and from operative positions relative to the saws of the cotton gin. The movement referred to is effected by means of the handle 31 which is fixed to a squared end of a shaft 44, suitably journaled in the standards 1 and 2. The handle lever 31 is preferably fixed at the side of the gin opposite to that on which the braking mechanism for the huller roller is mounted. However, it is immaterial which end of the gin it is mounted on so long as it is used in convenient position to rotate the shaft 44.

The shaft 44 has suitably secured thereto a bell crank 45 having the free end of one of its arms 46 connected to a strong tension spring 47, which has its other end hooked on to a lug 48 projecting from the framework. The other arm 49 of the bell crank 45 has its free end pivoted to a link 50 which has its other end pivotally connected to a bracket 51 extending from a U-shaped plate 52 which straddles the cross bar 43 where it projects outwardly beyond the left hand end of the gin as shown in Figure 2.

The arm 49 is bifurcated where it receives the pivoted end of the link 50, the lower end of which is recessed to form a stop shoulder 53 adapted to contact with the rear edge of the arm 49 to limit the outward movement of the linkage under the tension of the spring 47.

The tension spring 47 acts substantially as a counterbalance for the cotton box 7 and the mechanism carried thereby, in order to relieve the operator from the manual exertion in raising the heavy box without a counterbalance. It will be apparent from Figure 2 of the drawings that the arm 49 of the bell crank, and the link 50 connected to the end of this arm, constitute a toggle linkage for holding the cotton box locked in open position, as is common with all toggle linkages.

Figure 2:
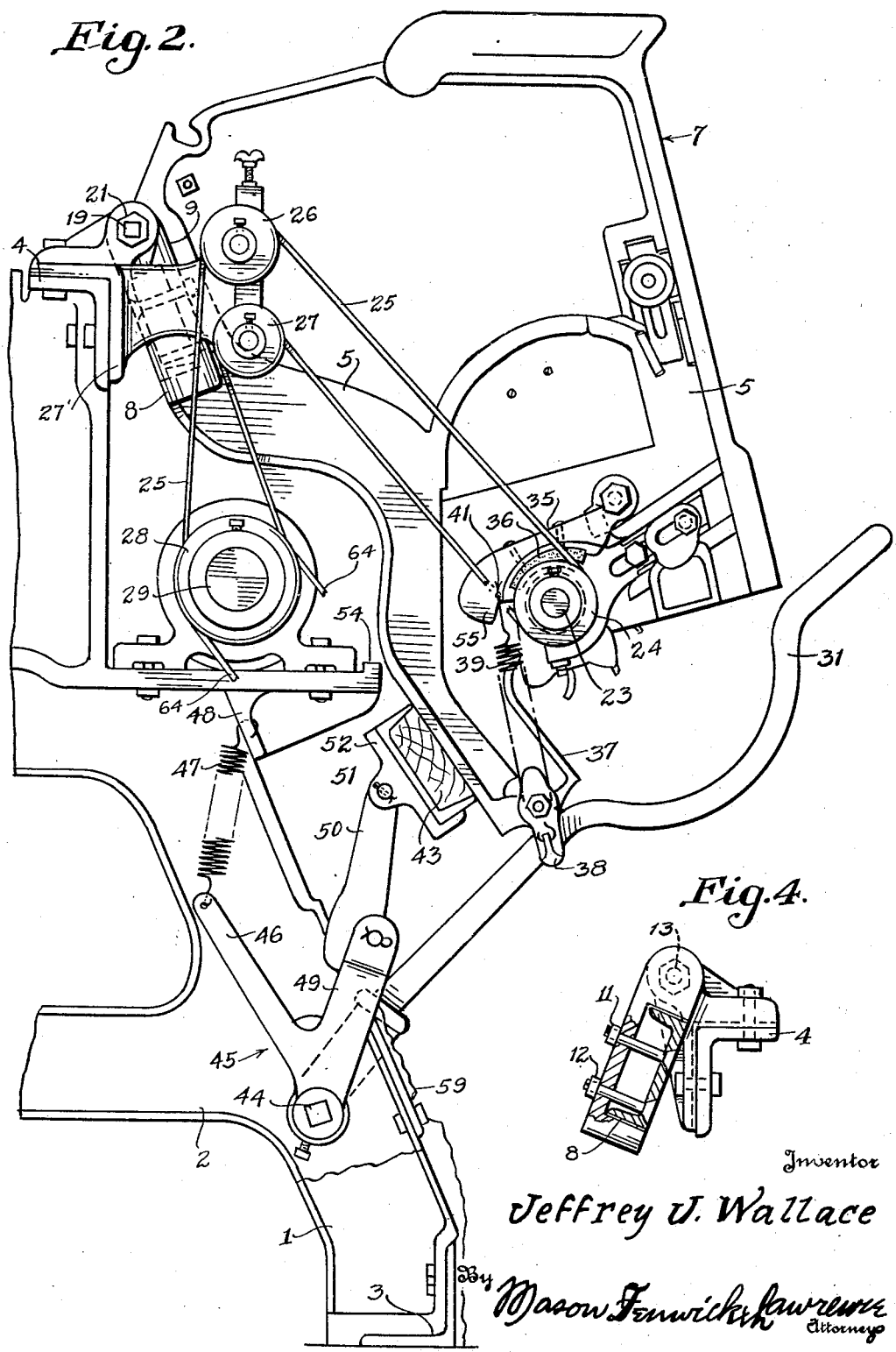
Figure 2 is a similar elevation of the same gin, with the cotton box in raised position.

It will be apparent from Figure 2 of the drawings that when the cotton box 7 is in the open position shown therein, the spring 39 pulls the brake shoe 35 downwardly against the brake pulley 32. In order to release this brake shoe from braking contact with the pulley 32, the frame is provided with an edge 54 adapted to contact with the end 55 of the brake shoe, the said end being formed as a cam to slide on side edge 54 and raise the brake shoe away from the brake pulley 32 when the cotton box is lowered to the closing position shown in Figure 1.

The belt 25 and the pulley mechanism on which it operates are so designed that the belt is under tension only when the cotton box is in the closed position, shown in Figure 1. When the cotton box is moved away from this closed position the tension on the belt slackens and the end 55 of the brake shoe 35 slides off the edge 54 on the frame and is pulled into braking position by means of the spring 39, thereby stopping the huller roller 30 from continuing its rotation and throwing cotton from the box.

A conveyor trough 56 extends directly below the huller roller 30 and is provided at its opposite ends with arms 57 and 58, suitably bolted to brackets 59 and 60 respectively secured to the standards 1 and 2. An endless screw 61 is journaled in the trough 56 and serves to move hulls and foreign matter discharged from the cotton box along the trough and to the end of the gin where it falls into a suitable receptacle onto an endless conveyor movable below the gin floor and under a battery of gins as is common in this art. The shaft 62 of screw 61 has a pulley 63 fixed thereto; and a belt 64 passing over pulley 63 and a pulley 64 on the saw shaft 29 serves to impart rotation from the saw shaft to the screw shaft 62.

The bottom of the trough 56 is perforated to form a screen through which cotton seeds, which are some times discharged with the hulls, are screened out and fall into a seed hopper 66 arranged directly below the conveyor hopper or trough 56.

What I claim is:

1. In a cotton gin, a supporting frame, a cotton box having a channel bar extending lengthwise thereof, a pair of recessed members fitting snugly over the ends of said channel bar and suitably secured thereto, axially alined trunnions extending outwardly from said members, a pair of bearing members secured to said frame and having bearing recesses to receive said trunnions, and means in said bearing members to contact with the ends of said trunnions for adjusting the cotton box bodily on said frame.

2. In a cotton gin, a supporting frame, a cotton box having axially alined trunnions extending outwardly from opposite sides thereof, bearing members secured to said frame and having recesses for pivotally receiving said trunnions, set screws passing through said members into contact with the ends of said trunnions for adjusting the cotton box bodily along the axis of said trunnions, and lock nuts engaging said set screws and bearing members.

3. In a cotton gin, a supporting frame, a cotton box having axially alined trunnions extending outwardly from opposite ends thereof, bearing members secured to said frame and having alined recesses for slidably and pivotally receiving said trunnions, and means in said bearing members for engaging said trunnions to slide the box bodily along the axis of said trunnions.

4. In a cotton gin, a supporting frame, a cotton box having axially alined trunnions extending outwardly from opposite ends thereof, bearing members secured to said frame and having alined recesses for slidably and pivotally receiving said trunnions, set screws extending through said bearing members into contact with the ends of said trunnions, and means for locking said set screws in said frame.

5. In a cotton gin, a supporting frame, a cotton box having axially alined trunnions extending outwardly from opposite ends thereof, bearing members secured to said frame and having alined recesses for slidably and pivotally receiving said trunnions, set screws threaded through said bearing members into contact with the ends of said trunnions for sliding said cotton box bodily relative to said frame, and lock nuts on said set screws for locking the cotton box in any desired position of lateral adjustment relative to said frame.

6. In a cotton gin, a supporting frame, a cotton box pivoted to said frame to be moved to and from operative position relative to the saws of said gin, a huller roller journaled in said cotton box, a brake bar pivoted to said cotton box, a brake pulley secured to the shaft of said roller, means for normally holding the brake bar in contact with the brake pulley, and means on said frame arranged to contact with said bar when the cotton box is moved to operative position for moving the bar out of braking contact with said brake pulley.

7. In a cotton gin, a supporting frame, a cotton box pivoted to said frame to be swung toward and from operative positions relative to the saws of said gin, a huller roller journaled in said cotton box, and cooperative means on said frame and box for automatically stopping the rotation of said huller roller when the box is moved to inoperative position and for automatically releasing the huller roller from said stopping means when the box is moved to operative position.

In testimony whereof I affix my signature.

JEFFREY JOHN WALLACE.